US008601536B2

(12) United States Patent
Liu et al.

(10) Patent No.: US 8,601,536 B2
(45) Date of Patent: Dec. 3, 2013

(54) BUS MONITOR FOR ENHANCING SOC SYSTEM SECURITY AND REALIZATION METHOD THEREOF

(75) Inventors: Huayu Liu, Guangdong (CN); Liangqing Wang, Guangdong (CN)

(73) Assignee: Shenzhen State Micro Technology Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 13/322,086

(22) PCT Filed: Feb. 28, 2011

(86) PCT No.: PCT/CN2011/000326
§ 371 (c)(1), (2), (4) Date: Nov. 22, 2011

(87) PCT Pub. No.: WO2012/062023
PCT Pub. Date: May 18, 2012

(65) Prior Publication Data
US 2013/0219452 A1 Aug. 22, 2013

(30) Foreign Application Priority Data
Nov. 12, 2010 (CN) .......................... 2010 1 0540994

(51) Int. Cl.
*G06F 17/00* (2006.01)

(52) U.S. Cl.
USPC ........ 726/1; 713/2; 713/164; 726/22; 726/34; 726/6

(58) Field of Classification Search
USPC .................. 726/1, 6, 22, 34; 713/2, 164, 189
See application file for complete search history.

(56) References Cited

U.S. PATENT DOCUMENTS

| | | | | |
|---|---|---|---|---|
| 8,160,244 | B2 * | 4/2012 | Buer | 380/30 |
| 8,266,444 | B2 * | 9/2012 | Desmicht et al. | 713/189 |
| 8,347,072 | B2 * | 1/2013 | Mittal | 713/2 |
| 2005/0204155 | A1 * | 9/2005 | Ravi et al. | 713/200 |
| 2009/0094702 | A1 * | 4/2009 | Yang et al. | 726/34 |

OTHER PUBLICATIONS

Fiorin L, Security Aspects in Networks on Chips, Aug. 2007, IEEE, vol. 7, pp. 1-4.*

* cited by examiner

*Primary Examiner* — Nathan Flynn
*Assistant Examiner* — Viral Lakhia
(74) *Attorney, Agent, or Firm* — Morris Manning & Martin LLP; Tim Tingkang Xia, Esq.

(57) ABSTRACT

The present invention discloses a bus monitor for enhancing SOC system security and a realization method thereof. The bus monitor disposed between a system bus and a system control unit includes a configuration unit, a condition judgment unit, an effective data selection unit, a hardware algorithm unit and a comparative output unit. Without affecting the bus access efficiency, the present invention provides the method capable of immediately monitoring the bus behavior, and the detection system notices whether a particular bus access serial behavior is changed due to an accidental fault or intentional attacking fault. If the particular bus access serial behavior is changed, the present invention warns the system to adopt a suitable security measure to prevent the security hidden trouble and leakage of classified information due to the incorrect system security process.

10 Claims, 5 Drawing Sheets

BUS MONITOR FOR ENHANCING SOC SYSTEM SECURITY AND REALIZATION METHOD THEREOF

BACKGROUND OF THE INVENTION

1. Field of the Invention

The invention relates to security of SOC system chip, in particular to a bus monitor for enhancing security of SOC system and a realization method thereof.

2. Description of the Related Art

With the rapid development of society information, the focuses and researches on information security are greatly increased. Security SOC chips are widely applied in the information community, providing functions such as security storage of the clients' key information, electronic signature, identity verification and information encryption and decryption, etc. Because the security SOC chip is a core element of the system security control, the protection to the security SOC chip shall be carefully noticed. For the attacking means to the security SOC chip, the system shall be correspondingly provided with security strategies for copying with the attacking means, such as security initialization, storage encryption protection, storage completeness verification, bus protection. The purposes of the security strategies are commonly to ensure that the security SOC chip can be functioned in a security way. However, the security strategy is only to emphasize the protection behavior and not to pay much attention to protection effect, and several security measures are merely focused on certain independent protection behaviors, such as the memory protection can limit the protection to a particular zone in the memory. System security protection mechanism, for the most part, is essentially performed by a series of handling processes. For example, when a particular unpartitioned security program is executed, this security program shall be entirely protected by the security protection mechanism from being terminated or inserted by other programs. So far, in the security SOC chip, it is rarely to see the detection protection measure utilized to determine whether the serial functional behavior on the data transmission channel is abnormal. An experienced attacker often utilizes the program leakage to modify the functional behavior of the security chip by several common attacking ways, such as jump instruction attack, interruption attack and stack overflow attack, or directly performs fault attack to destroy the execution of the security initialization or security program to cause the chip functioned abnormally. To overcome the disadvantage above based on the conventional security protection strategy, the final reflected bus serial behavior of these security strategies shall be additionally detected. However, no security algorithm is directly provided to immediately monitor the system bus of the data transmission channel.

Thus, it is essential to solve the above problems to protect the security SOC chip by providing how to immediately monitor the system bus of the data transmission channel and how to determine whether the bus serial behavior is normal.

BRIEF SUMMARY OF THE INVENTION

The purpose of the invention is to provide a bus monitor for enhancing SOC system security and a realization method thereof to solve the problems in the conventional skills above.

By monitoring the security configuration process or security program functional process, the present invention can find an error according to the accuracy and completeness of the particular bus access serial behavior corresponding to the SOC bus and produces a system alert to effectively prevent the information leakage.

The technology project of the present invention is to provide a bus monitor for enhancing system security of system on chip. The bus monitor disposed between a system bus and a system control unit comprises a configuration unit, a condition judgment unit, an effective data selection unit, a hardware algorithm unit and a comparative output unit.

The configuration unit is adapted to install and store a configured information required to be monitored from a bus control signal and to update the state of the bus monitor.

The condition judgment unit is incorporated with a current bus behavior information given by the bus control signal, based on the configured information of the configuration unit, to determine whether a monitoring process shall be enabled, and a control signal is produced to the effective data selection unit if the monitoring process is required.

The effective data selection unit, based on a control information of the condition judgment unit and the configured information of the configuration unit, transmits a bus monitoring to-be-calculated data which is selected from a bus address of bus access, a bus master device number, a bus reading data or writing data, and a secret key in the configuration unit to the hardware algorithm unit and informs the hardware algorithm unit to operate the to-be-calculated data.

The hardware algorithm unit, based on the control signal transmitted from the configuration unit and the condition judgment unit, operates the to-be-calculated data output from the effective data selection unit and transmits a final calculation result to the comparative output unit.

The comparative output unit compares the output result of the hardware algorithm unit with a preset condition of the configuration unit and transmits an alarm signal to the system control unit if the output result of the hardware algorithm unit is discordance with the preset condition of the configuration unit.

The present invention further provides a bus monitoring method for enhancing system security of system on chip, comprising the steps as follows;

(a1) an information configuring step, providing a processor to utilize the bus to dispose a configured information required in a configuration unit in the bus monitoring process;

(a2) a judgement step, judging whether a monitoring process shall be enabled by incorporating a condition judgment unit, based on the configured information of the configuration unit, with a current bus behavior information given by the bus control signal, producing a control signal to an effective data selection unit and transmitting a to-be-calculated data to a hardware algorithm unit;

(a3) a to-be-calculated data processing step, providing a to-be-calculated data selected from a bus address of bus access, a bus master device number, a bus reading data or writing data and a secret key in the configuration unit by the effective data selection unit based on a control information of the condition judgment unit and transmitting the to-be-calculated data to the hardware algorithm unit to instruct the hardware algorithm unit to operate the to-be-calculated data;

(a4) operating the to-be-calculated data under a selected algorithm of the configuration unit by the hardware algorithm unit based on the control signal transmitted from the effective data selection unit and transmitting a final calculation result to a comparative output unit when a bus serial monitoring process is completed and a final calculation result is transmitted to the hardware algorithm unit;

(a5) a comparing step, comparing the output result of the hardware algorithm unit with a preset expected result of the configuration unit by the comparative output unit and triggering and transmitting an alarm signal to the system control unit if the output result of the hardware algorithm unit is discordance with the preset expected result of the configuration unit; and (a6) providing a counter inside the bus monitor to automatically increase progressively and returning to the step (a2) for repeating monitoring process when the bus monitor completes an effective access operation once, and terminating the monitoring process based on a control manner of a control register when the bus monitor completes the number of times of an effective access defined by the monitoring length register of the configuration unit, or repeating the monitoring process when in the next time the bus access satisfying a monitoring start condition is occurred.

In comparison with the conventional skills, the present invention provides advantageous effects as follows.

In the conventional skills, due to the security strategy emphasizing the protection behavior and not paying much attention to protection effect, the system cannot immediately adopt a remedial security measure and thus the information leakage might be occurred when the protection behavior is failed under the malicious attack or accidental fault. However, the present invention monitors the bus serial access behavior of the security SOC chip, so that an alert signal can be immediately transmitted to the system to adopt the remedial security measure when the monitored bus serial access behavior is abnormal. Thus, a bus monitor enhancing information security of the SOC system can be realized.

The invention can effectively ehance the protection ability of the SOC system to the fault attack and immediately warns the system to adopt the remedial security measure when an error behavior of the security configuration or key process is occurred under the intentional fault or the accidental fault.

The present invention can solve the error by the completeness and integrity of the security configuration process and key program from the final bus transmission channel and increase the tamper-proof ability of the security configuration data and the key process.

The present invention realizes a real-time monitoring to the bus behavior on the consideration of the complication of the bus time sequence and the possible configurations of the to-be-monitored data and the monitoring length.

With the integral algorithm operation to the bus address and information of the particular access serial and the allocative secret key in the security SOC system functional process, the present invention can determine whether the particular access serial is tampered according to the comparison between the final operation result and the expected result.

The present invention can prevent the bus address or important information being forged or attacked.

The present invention can prevent a bus access raised by a faked bus master device pretended by some non-security bus master devices.

After the designated bus serial monitoring process is completed by the present invention, the client is allowed to determine whether the remonitoring process shall be performed.

The present invention does not affect the system bus behavior.

On the consideration of the waiting overtime of the bus when the system is shut down or crashed, the present invention allows the client to allocate a maximum overtime waiting period. All behaviors of the overtime bus is recorded and an overtime alert signal is transmitted to the SOC system when the bus waiting period is greater than the maximum overtime waiting period, so that the SOC system enforcedly recovers the bus transmission based on the alert information and solves the abnormalities. With the processing mechanism, the abnormal behavior of the SOC system situated in a long-term unexpected waiting overtime status can be prevented, thereby increasing the working efficiency of the bus and assuring certain key missions to be timely executed.

In particular, the present invention is suitable for the security SOC system used in the application scene which is involved with sensitive data and easily attacked, tending to integrate the security SOC system without loading to the time sequence and performance of the whole SOC chip.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and shall not be taken in a limiting sense. The scope of the invention is best determined by reference to the appended claims.

The main idea of the present invention is to immediately monitor a bus transmission serial related to the security key. If the bus transmission serial to be monitored is discordance with an anticipated behavior, the bus transmission serial is considered as abnormalities possibly caused by accidental fault, intentional fault or tampering attack, and an alert signal is immediately transmitted to the system to ensure these abnormalities can be solved in time.

Figure 1:
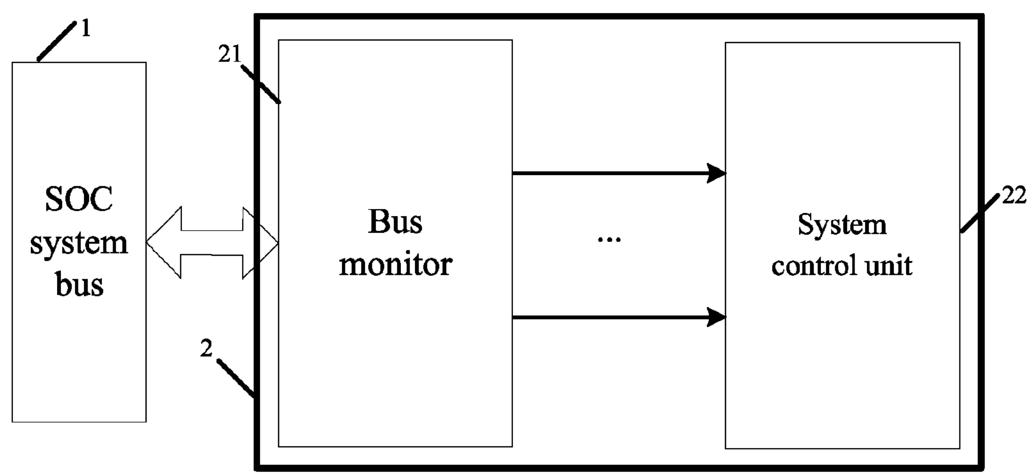
FIG. 1 is a schematic view showing an internal structure of a bus monitor of the invention configured in a security SOC chip.

FIG. 1 is a schematic view showing an internal structure of a bus monitor of the invention configured in a security SOC chip. The present invention comprises a SOC system bus 1, a bus monitor 21 and a system control unit 22, wherein the bus monitor 21) and the system control unit 22 are disposed in a SOC chip 2. In the security SOC chip, the SOC system bus 1) is a key channel for data transmitting from a master device (e.g., CPU, DMA) to a slave device (e.g., RAM). Thus, it is understood that the SOC system bus 1 plays an important role in the configuration of the security SOC chip.

Figure 2:
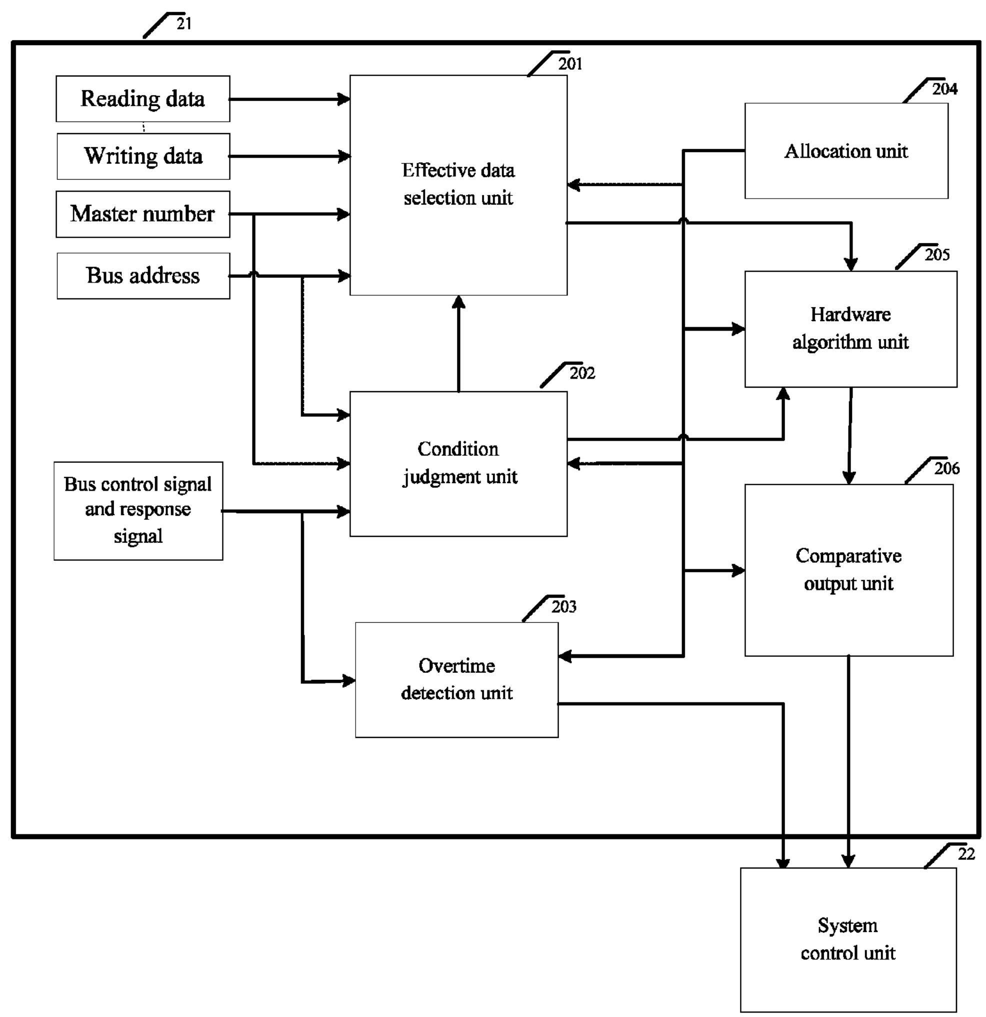
FIG. 2 is a functional block diagram of the bus monitor in FIG. 1.

In FIG. 2, the bus monitor 21 of the present invention comprises an effective data selection unit 201, a condition judgment unit 202, an overtime detection unit 203, a configuration unit 204, a hardware algorithm unit 205 and a comparative output unit 206. According to the design requirements, each of these unit modules can be adequately adjusted.

Figure 6:
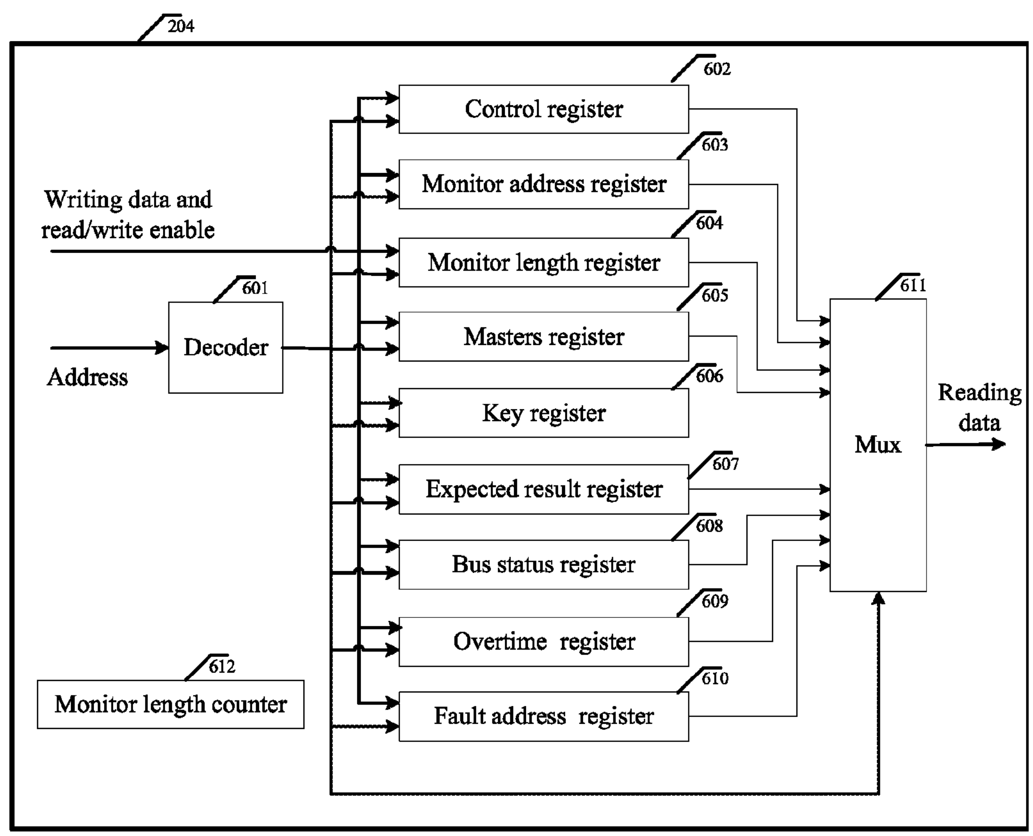
FIG. 6 is a structural block diagram of a configuration unit.

The configuration unit 204 utilized to store the configured information and the state information of the bus monitor. As shown in FIG. 6, the configuration unit 204 mainly comprises a decoder 601, a control register 602, a monitoring initial address register 603, a monitoring length register 604, a major register 605, a secret key register 606, an expected monitoring result register 607, a bus state register 608, an overtime register 609, a fault address register 610, a reading data selector 611 and a monitoring length counter 612. The detailed functions of these registers are described as follows.

Based on the bus address code of the bus access monitor, the decoder 601 produces the selection enable signals for every registers of the configuration unit 204. The control register 602 is utilized to record the regular configured information of the bus monitor 21, and the bus monitor 21 is operated according to the regular configured information stored in the control register 602. The regular configured information comprises a monitor enable bit, which is a global control bit of the bus monitor 21 and through which the client can allocate to determine as valid or invalid state to enable or disable the bus monitoring of the bus monitor 21. The trigger mode control bit of the bus monitor 21 is configured to realize a monitoring enabling mode which is selectable from two following modes: immediately monitoring or monitoring from designated address. The remonitoring enable control bit is configured to determine whether the remonitoring function is enabled with respect to different states. If the remonitoring function is enabled and the designated effective length serial monitoring process is completed, the monitoring process is enabled again when the bus behavior satisfies the monitoring condition in the next time, or the monitoring process is terminated when the effective length serial monitoring process is completed. The overtime monitoring control bit is configured to determine whether the bus overtime behavior shall be monitored. A monitoring condition control bit is utilized to determine which is bus access serial required to be monitored. For the monitoring algorithm selection bit, the designers can programmably determine a suitable algorithm themselves to monitor the bus behavior according to the security need. The to-be-calculated data selection bit is utilized to indicatively determine a to-be-calculated data selected from one or all of the bus master device number, the bus address, the bus reading data, the bus writing data and the secret key output, which are satisfied with the monitoring condition.

The monitoring initial address register 603 is utilized to record the initial monitoring address of the bus monitor 21. When the trigger mode control bit is selected to perform a monitoring process beginning from the designated address, the monitoring process is enabled when the bus functional address monitored by the bus monitor 21 is matched with the initial address under the bus behavior satisfying the monitoring condition, or the bus monitor is situated in an idle condition without performing the monitoring process.

The monitoring length register 604 is utilized to record the effective bus access serial length monitored by the bus monitor 21 from the client's need.

The major register 605 is utilized to allocate a master device number of the bus monitor 21 to be monitored. If the configured monitoring condition is matched with the master device number, the monitoring condition is satisfied only when the bus monitor 21 detects that the master device functioned by the current bus is matched with one or more master device numbers of the major register 605. This function can prevent a bus access raised by a faked bus master device pretended by some non-security bus master devices. When the bus monitor 21 detects that the current master device is illegal, the bus monitor 21 transmits alert information to prevent the key information be illegally retrieved or destroyed.

The secret key register 606 is utilized to allocate the secret key in the monitoring process, wherein the secret key is unreadable. In the bus monitor 21, the secret key can be involved in the operation at a certain fixed point and also can be involved in an immediate operation, capable of preventing the expected result from being tampered by the attacker based on the principle of the bus monitor and assuring integrality and security in the monitoring process.

The expected monitoring result register 607 is utilized to allocate the operation result of the monitored data which is expected by the client, after the bus serial monitoring process at the designated length is completed.

After the bus serial monitoring process at the regulated length is completed, the bus state register 608 is utilized to record the data in which the comparative output unit 206 writes with the final comparison result (normal or error), and the client can inquire whether a certain bus functional process is normal via the bus state register 608 of the configuration unit 204. Meanwhile, some bus behaviors such as an overtime bus monitored by the bus monitor can also be reflected from the bus state register 608 of the configuration unit 204. The bus state register 608 of the configuration unit 204 ensures that the bus behavior can be immediately acquired by the bus master device.

The overtime register 609 is utilized to record the maximum bus device waiting period, and the client can produce a suitable configuration according to the need of the system itself. For example, the overtime register 609 can be configured with a larger value if a longer waiting period is often required by some device in the system. In general, it is necessary to estimate the SOC system device to obtain a suitable value when the overtime register 609 is configured, such that the incorrect overtime behavior and failed to report the overtime behavior can be prevented and the working efficiency of the bus can be guaranteed. When the bus is overtimed, the bus monitor immediately transmits an overtime alert signal, indicating the system to enforcedly terminate the current bus access and to eliminate the system security hidden trouble or system fault due to the overtime bus.

The fault address register 610 is utilized to record the address when the overtime bus is fault. When the bus overtime behavior is detected by the overtime detection unit 203, the bus address of the overtime state is wrote into the fault address register 610 by the overtime detection unit 203, and the master device can acquire the bus overtime information by accessing the fault address register 610.

Based on the selected signal output from the decoder 601, the reading data selector 611 returns the reading data, which is determined by a suitable register selected from those of the configuration unit 204, to the system bus.

The monitoring length counter 612 is utilized to count in the monitoring process. Before performing the bus serial monitoring process, the monitoring length counter 612 is set as zero. When the bus serial monitoring process is performed, the value of the monitoring length counter 612 increases progressively once whenever the bus access satisfying the monitoring condition is monitored, and this time the bus serial monitoring process is completed until the counting value of the monitoring length counter 612 is matched to the designated length of the monitoring length register. The configuration unit 204 is a slave device of the SOC system. In the bus monitor 21 of the present invention, the bus monitoring function is determined by the accuracy of the configuration unit 204.

The condition judgment unit 202 is a main control unit of the present invention, mainly utilized to determine whether the bus function satisfies the monitoring condition of the bus monitor 21. Based on the monitoring condition control bit offered by the overtime detection unit 203, the condition judgment unit 202 is immediately utilized to filter the control information containing the address of the bus. When the function of the bus behavior satisfies the monitoring condition, the effective data selection unit 201 is indicated to acquire the effective content to be transmitted to the hardware algorithm unit 205 for calculation. If the function of the bus behavior does not satisfy the monitoring condition, the bus functional address is omitted. The filtering condition of the condition judgment unit 202 with respect to the bus function can be selected from one or more conditions as follows: the master device number is matched, loading instruction function or data transmission function, reading access or writing access, private access or general access, etc. The matching condition of the master device number can be utilized to monitor the bus function of the master device number, and the loading instruction functional condition can be utilized to monitor the execution process of the microprocessor order. It is unnecessary to enable the matching function of the master device number if the master device number is not required to be noticed, so that all bus access functions can be monitored. The condition judgment unit 202 still has to determine whether the bus serial monitoring process at the regulated length is completed, and the completed indication signal is transmitted to the hardware algorithm unit 205 by the condition judgment unit 202.

With respect to the bus function satisfying the monitoring condition, based on the control information of the condition judgment unit 202, the effective data selection unit 201 selects a to-be-calculated data from the bus address, the bus master device number, the bus reading data or writing data and the secret key output from the configuration unit 204, transmits the selected to-be-calculated data organized as a general operation format to the hardware algorithm unit 205, and indicates the hardware algorithm unit 205 to perform operation on the selected to-be-calculated data.

The hardware algorithm unit 205 is a core unit of the present invention, and the working speed thereof directly determines the real time of monitoring the bus. The hardware algorithm unit 205 is enabled when receiving a calculation indication signal from the effective data selection unit 201, and the to-be-calculated data transmitted from the hardware algorithm unit 205 is operated by a suitable algorithm selected from the algorithm selection control bit given by the configuration unit 204. The operation of the hardware algorithm unit bus functional address 205 is completed when receiving an end-monitoring indication signal transmitted from the condition judgment unit 202, and the hardware algorithm unit 205 is returned to the initial state thereof prepared for the next monitoring process after the operation result is transmitted to the comparative output unit 206. The hardware algorithm unit 205 comprises but not limited to the algorithms as follows: cyclic redundancy check (CRC) algorithm (e.g., CRC-16, CRC-32), HASH algorithm (e.g., SHA-1, SHA-256) and symmetric cryptographic algorithm (e.g., AES, DES), etc. The CRC algorithm is relatively simpler, rapid calculation and excellent real-time quality. The HASH algorithm is relatively complicate, but the HASH algorithm can ensure that the completeness effect of the bus serial is much better than that of CRC algorithm. The performance of the symmetric cryptographic algorithm is between the CRC algorithm and the HASH algorithm. The hardware algorithm selected and supported by the hardware algorithm unit 205 is determined by the bus frequency of the system bus and the algorithm processing ability. The designer of the security chip can integrate one or more algorithms according to the index requirement, such as time sequence and area of the chip.

In the present invention, the comparative output unit 206 is utilized to compare the final operation result of the hardware algorithm unit 205 with the register value of expected monitoring result of the configuration unit 204. If the final operation result of the hardware algorithm unit 205 is discordance with the register value of expected monitoring result of the configuration unit bus functional address 204, the bus serial behavior is considered as abnormality being possibly caused by the factors such as attacks or faults, and an alert signal is immediately transmitted to the system control unit 22, so that a reasonable response is provided by the system control unit 22 with respect to the bus serial error based on the client's pre-configuration, such as demanding to reset the CPU or to terminate the operation of some master and slave devices. Under the circumstance of the important system data being attacked and destroyed, this immediate processing mechanism guarantees that the system-level response can be provided according to the signal security level to possibly ensure the safety of the whole security system.

The overtime detection unit 203 is utilized to detect whether the SOC bus is overtimed. The overtime detection unit 203 immediately monitors whether the bus function is overtimed, based on the current bus control signal and the maximum bus waiting period installed in the overtime register of the configuration unit 204. When the bus waiting period is greater than the maximum bus waiting period installed in the overtime register of the configuration unit 204, the overtime detection unit 203 triggers and transmits an overtime alert information to the system control unit 22, so that a reasonable response is provided by the system control unit 22 with respect to the bus overtime behavior based on the client's pre-configuration. A commonly-seen overtime response mechanism is that the system enforcedly terminates the current bus function and then performs abnormal treatment process to treat the overtime behavior, thereby preventing the abnormal behavior of the SOC system situated in a long-term unexpected waiting overtime status, assuring certain key missions to be timely executed, and eliminating the system security hidden trouble or system fault due to the overtime process.

The above-described processes undergo without affecting the normal working in the SOC system, so that the completeness of the system works can be guaranteed and the system security function can be realized.

Figure 3:
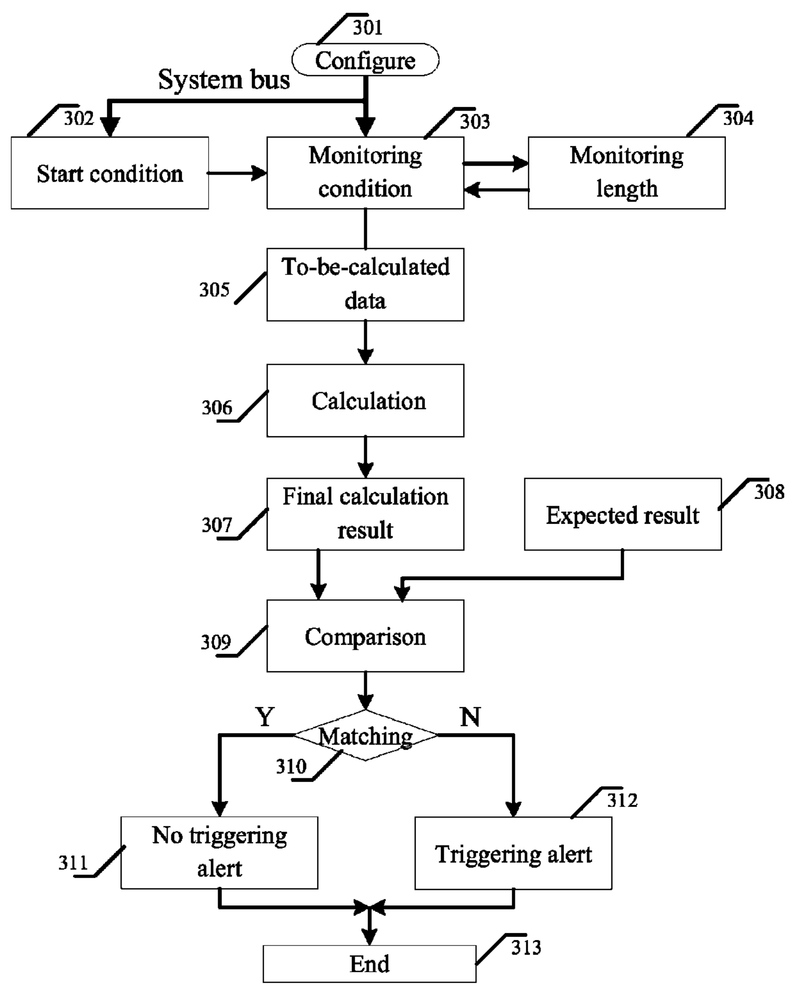
FIG. 3 is a flow chart of the bus monitor.

As shown in FIG. 3, the working flow chart of the bus monitor 21 of the present invention concretely comprises the following steps (a1) to (a6).

In step (a1), a configure 301 provided with a processor is to utilize the bus to dispose a configured information required in a configuration unit in the bus monitoring process.

In step (a2), a judgment step is to judge whether a monitoring process shall be enabled by incorporating a condition judgment unit, based on the configured information of the configuration unit, with a current bus behavior information given by the bus control signal, to produce a control signal to an effective data selection unit and to transmit a to-be-calculated data to a hardware algorithm unit.

Actually, the step (a2) is utilized to retrieve the bus function satisfying the monitoring conditions, comprising the following steps (b1) to (b3).

In step (b1), a step for retrieving a start condition 302 is to detect a bus function satisfying a first monitoring condition by a condition judgment unit 202 based on the configured information of a configuration unit 204, to serve the first bus function satisfying the monitoring condition as a beginning of a bus serial function, and to neglect the bus function from and between the configuration completed by the processor and the first satisfied monitoring condition by the bus monitor.

In step (b2), a step for retrieving a monitoring condition 303 is to judge whether the bus is monitored by the condition judgment unit 202 based on the configured information of the configuration unit 204 and the current bus behavior information given by the bus control signal incorporated therewith, to produce the control signal to the effective data selection unit, and to transmit the to-be-calculated data to the hardware algorithm unit.

In step (b3), a step for retrieving a monitoring length 304 is to increase the value of a monitoring length counter 612 once whenever the bus access satisfying the monitoring condition is monitored, and to transmit an end-monitoring indication to the condition judgment unit 202 when a counting value of the monitoring length counter 612 is matched to the designated length of the monitoring length register 604.

In step (a3), a to-be-calculated data processing 305 is to provide a to-be-calculated data selected from a bus address of bus access, a bus master device number, a bus reading data or writing data and a secret key in the configuration unit by the effective data selection unit 201 based on a control information of the condition judgment unit and to transmit the to-be-calculated data to the hardware algorithm unit to instruct the hardware algorithm unit to operate the to-be-calculated data.

In step (a4), a calculation 306 is to operate the to-be-calculated data under a selected algorithm of the configuration unit by the hardware algorithm unit 205 based on the control signal transmitted from the effective data selection unit and to transmit a final calculation result 307 to the comparative output unit.

In step (a5), a comparison 309 is to compare the output result of the hardware algorithm unit 205 with a preset expected result of the configuration unit by the comparative output unit 206, and to trigger and transmit an alarm signal 311 to the system control unit if the output result of the hardware algorithm unit 205 is discordance with the preset expected result 308 of the configuration unit.

In step (a6), a counter is provided inside the bus monitor to automatically increase progressively and returning to the step (a2) for repeating monitoring process when the bus monitor completes an effective access operation once, and terminating the monitoring process based on a control manner of a control register when the bus monitor completes the number of times of an effective access defined by the monitoring length register of the configuration unit 204, or repeating the monitoring process when in the next time the bus access satisfying a monitoring start condition is occurred.

In the monitoring process, the bus monitor firstly determines whether the bus and the information (e.g., data and address, etc.) thereon shall be monitored according to the register configuration in the configuration unit 204. The bus control information served as to-be-monitored data is transmitted to the hardware algorithm circuit for operation, and the secret key can be involved in the immediate operation according to the security need. After the serial monitoring process at the designated length is completed, the transmission result is correctly proved if the operation result is accordance with and the expected value in the comparison process—otherwise the system controller is given with alert information to perform the subsequent processes. If the register is configured to perform the remonitoring process, the bus monitor repeats the process of the data flow chart in FIG. 3 after this monitoring process is completed. If a period of bus serial behavior after resetting the system shall be monitored, an implied configuration of the configuration unit 204 can be set to immediately begin monitoring, and the monitoring length register is impliedly set as a reasonable nonzero value. After the system is functioned, the length and expected result of this monitored bus serial shall be immediately updated to the configuration unit 204. When the system is reset, the reset bus serial behavior shall be immediately monitored by the bus monitor. If the monitoring length register of the bus monitor and the expected result register are not immediately configured, the bus serial transmits an alert signal to the system after monitoring the implied length. If the monitoring length register of the bus monitor and the expected result register are immediately configured, the bus access serial at the designated length is monitored by the bus monitor, after resetting the system, to determine whether the bus access serial is abnormal under the factors such as attacks or faults.

Figure 4:
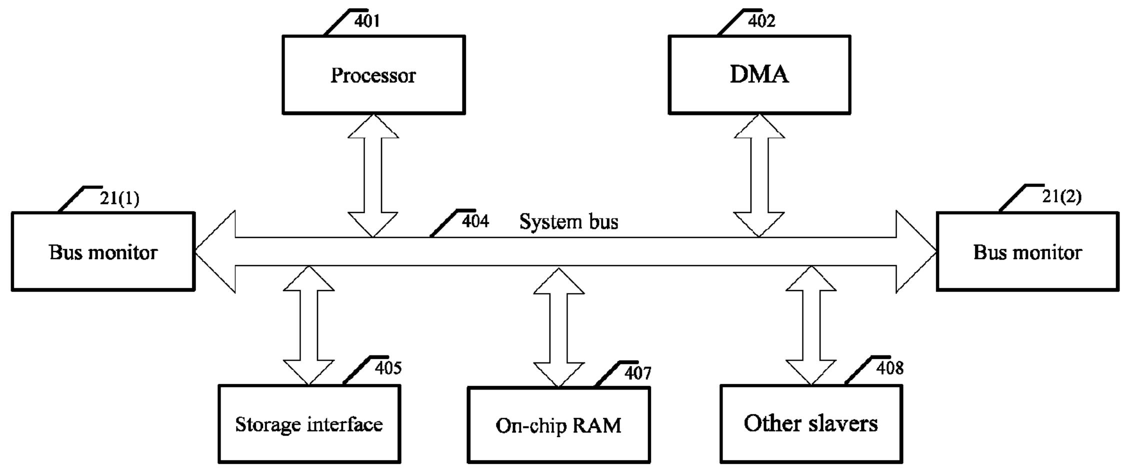
FIG. 4 is a connection block diagram of the bus monitor in a single-bus security SOC chip.

As shown in FIG. 4, a typical single-bus security SOC chip comprises a plurality of master devices including a processor 401 and a DMA 402, on-chip RAM 407, a storage interface 405, and the bus monitor 21(1) and the bus monitor 21(2) provided in the present invention. A system bus 404 served as a data transmission channel is utilized to connect the master device to the salve device. The system of the present invention differs from the conventional security SOC chip system in that two independent and integrated bus monitors 21 are provided to directly and immediately monitor the SOC bus, thereby enhancing the security performance of the security SOC chip.

Figure 5:
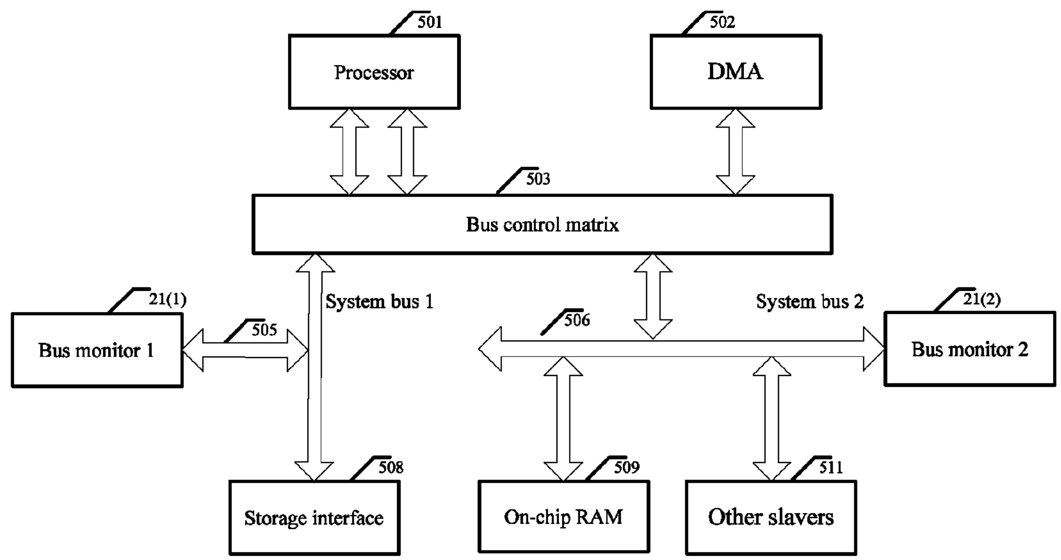
FIG. 5 is a connection block diagram of the bus monitor in a multiple-bus security SOC chip.

As shown in FIG. 5, a typical multiple-bus security SOC chip comprises a plurality of master devices including a processor 501 and a DMA 402, on-chip RAM 509, a high bandwidth storage interface 508, and the bus monitor 21(1) and the bus monitor 21(2) provided in the present invention. Two system buses 505 and 506 are served as data transmission channels, and a bus control matrix 503 realizes several juxtaposed buses to cross access between different address regions.

In the security SOC chip system, the amount of the bus monitor 21 shall be correspondingly changed with respect to that of the bus, thereby monitoring each of the bus. In FIG. 5, the bus monitor 21(1) is utilized to monitor the system bus 505, the bus monitor 21(2) independent of the bus monitor 21(1) is utilized to monitor the system bus 506, and other behavior thereof are identical to the single-bus security SOC chip, thereby ensuring the security of all buses in the security SOC chip system.

Without affecting the bus access efficiency, the method of the present invention can immediately monitor the bus behavior, and the detection system notices whether the particular bus access serial behavior is changed due to accidental fault or intentional attacking fault. If the particular bus access serial behavior is changed, the present invention warns the system to adopt a suitable security measure to prevent the security hidden trouble and leakage of classified information due to the incorrect system security process.

The present invention can monitor and report the SOC bus protocol error to the system for performing a suitable response therefrom. Further, the present invention can monitor an overtime bus caused by an improper handling or other factors and report the overtime condition to the system. The system can adopt a suitable measure to immediately recovery the bus function, ensuring that certain key missions can be normally executed when the bus is overtimed.

To sum up, the invention provides the bus monitor for enhancing the information security of the SOC system and the realization method thereof, ensuring completeness, real time and security of the transmitted key information via the bus, increasing the working efficiency of the system bus and the stability of the information security system, and eliminating abnormality caused by attacks and faults.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A bus monitor for enhancing system security of system on chip, it is characterized in that the bus monitor disposed between a system bus and a system control unit comprises a configuration unit, a condition judgment unit, an effective data selection unit, a hardware algorithm unit and a comparative output unit, wherein:

the configuration unit is adapted to install and store a configured information required to be monitored from a bus control signal and to update the state of the bus monitor;

the condition judgment unit is incorporated with a current bus behavior information given by the bus control signal, based on the configured information of the configuration unit, to determine whether a monitoring process shall be enabled, and a control signal is produced to the effective data selection unit if the monitoring process is required;

the effective data selection unit, based on a control information of the condition judgment unit and the configured information of the configuration unit, transmits a bus monitoring to-be-calculated data which is selected from a bus address of bus access, a bus master device number, a bus reading data or writing data, and a secret key in the configuration unit to the hardware algorithm unit and informs the hardware algorithm unit to operate the to-be-calculated data;

the hardware algorithm unit, based on the control signal transmitted from the configuration unit and the condition judgment unit, operates the to-be-calculated data output from the effective data selection unit and transmits a final calculation result to the comparative output unit; and the comparative output unit compares the output result of the hardware algorithm unit with a preset condition of the configuration unit and transmits an alarm signal to the system control unit if the output result of the hardware algorithm unit is discordance with the preset condition of the configuration unit.

2. The bus monitor as claimed in claim 1, characterized in that the bus monitor further comprises an overtime detection unit utilized to immediately monitor whether the bus control signal is overtimed and transmits a signal to the system control unit if the bus control signal is overtimed.

3. The bus monitor as claimed in claim 1, characterized in that the configuration unit comprises a control register, a monitoring initial address register, a monitoring length register, at least one major register, a preset secret key register, an expected monitoring result register and an overtime register, wherein the control register is utilized to realize working behavior of the bus monitor in different controlling manner, the monitoring initial address register is utilized to store a bus access initial address when the bus monitor begins to monitor, the monitoring length register is utilized to allocate the number of times of an effective bus access of the bus monitor when monitoring, the major register is utilized to allocate and monitor a bus access of a designated bus master device, the preset secret key register is utilized to store a preset secret key, the expected monitoring result register is utilized to store an expected monitor result, and the overtime register is utilized to a maximum waiting period and to transmit alert information to the system control unit when a bus waiting period is greater than a configured value thereof.

4. The bus monitor as claimed in claim 3, characterized in that the bus monitor further comprises a bus state register utilized to immediately inquire bus state.

5. The bus monitor as claimed in claim 3, characterized in that the bus monitor further comprises a fault address register utilized to store an overtime bus address for being inquired by the master device when an overtime bus is monitored by the bus monitor.

6. The bus monitor as claimed in claim 1, characterized in that a to-be-calculated content satisfying a monitoring condition in the bus access comprises but not limited to the bus address, the bus master device number, the bus reading data or writing data and the secret key output from the configuration unit, which are partially or entirely selected as a to-be-calculated data for the effective data selection unit based on the configured information of the configuration unit.

7. The bus monitor as claimed in claim 1, characterized in that the to-be-calculated data is operated by the hardware algorithm unit selected of cyclic redundancy check algorithm, HASH algorithm or symmetric cryptographic algorithm.

8. A bus monitoring method for enhancing system security of system on chip, it is characterized in that the bus monitoring method comprises the steps of:

(a1) an information configuring step, providing a processor to utilize the bus to dispose a configured information required in a configuration unit in the bus monitoring process;

(a2) a judgment step, judging whether a monitoring process shall be enabled by incorporating a condition judgment unit, based on the configured information of the configuration unit, with a current bus behavior information given by the bus control signal, producing a control signal to an effective data selection unit and transmitting a to-be-calculated data to a hardware algorithm unit;

(a3) a to-be-calculated data processing step, providing a to-be-calculated data selected from a bus address of bus access, a bus master device number, a bus reading data or writing data and a secret key in the configuration unit by the effective data selection unit based on a control information of the condition judgment unit and transmitting the to-be-calculated data to the hardware algorithm unit to instruct the hardware algorithm unit to operate the to-be-calculated data;

(a4) a calculation step, operating the to-be-calculated data under a selected algorithm of the configuration unit by the hardware algorithm unit based on the control signal transmitted from the effective data selection unit and transmitting a final calculation result to a comparative output unit when a bus serial monitoring process is completed and a final calculation result is transmitted to the hardware algorithm unit;

(a5) a comparing step, comparing the output result of the hardware algorithm unit with a preset expected result of the configuration unit by the comparative output unit and triggering and transmitting an alarm signal to the system control unit if the output result of the hardware algorithm unit is discordance with the preset expected result of the configuration unit; and (a6) providing a counter inside the bus monitor to automatically increase progressively and returning to the step (a2) for repeating monitoring process when the bus monitor completes an effective access operation once, and terminating the monitoring process based on a control manner of a control register when the bus monitor completes the number of times of an effective access defined by the monitoring length register of the configuration unit, or repeating the monitoring process when in the next time the bus access satisfying a monitoring start condition is occurred.

9. The bus monitoring method as claimed in claim 8, characterized in that configured information comprises a monitor enable bit, a trigger mode control bit, a monitoring condition, a remonitoring enable control bit, an overtime monitoring control bit, a monitoring algorithm selection bit, a to-be-calculated data selection bit, preset secret key, a monitoring initial address and/or an expected result.

10. The bus monitoring method as claimed in claim 8, characterized in that the step (a2) comprises the steps of:

a start condition retrieving step, detecting a bus function satisfying a first monitoring condition by a condition judgment unit 202 based on the configured information of a configuration unit 204, serving the first bus function satisfying the monitoring condition as a beginning of a bus serial function, and neglecting the bus function from and between the configuration completed by the processor and the first satisfied monitoring condition by the bus monitor;

a monitoring condition retrieving step, judging whether the bus is monitored by the condition judgment unit 202 based on the configured information of the configuration unit 204 and the current bus behavior information given by the bus control signal incorporated therewith, producing the control signal to the effective data selection unit, and transmitting the to-be-calculated data to the hardware algorithm unit; and a monitoring length retrieving step, increasing the value of a monitoring length counter 612 once whenever the bus access satisfying the monitoring condition is monitored, and transmitting an end-monitoring indication to the condition judgment unit 202 when a counting value of the monitoring length counter 612 is matched to the designated length of the monitoring length register.

* * * * *